United States Patent
Tenglund

Patent Number: 5,310,224
Date of Patent: May 10, 1994

[54] PROCESS FOR MANUFACTURING A HOSE COUPLING COMPONENT INTENDED PARTICULARLY FOR A HOSE CONNECTION BETWEEN A TURBO UNIT AND AN AIR COOLER, AND A HOSE COUPLING COMPONENT OF THIS TYPE

[75] Inventor: Lars Tenglund, Henån, Sweden

[73] Assignee: AB Volvo, Göteborg, Sweden

[21] Appl. No.: 867,188

[22] PCT Filed: Jan. 16, 1991

[86] PCT No.: PCT/SE91/00026
§ 371 Date: Jul. 1, 1992
§ 102(e) Date: Jul. 1, 1992

[87] PCT Pub. No.: WO91/10859
PCT Pub. Date: Jul. 25, 1991

[30] Foreign Application Priority Data
Jan. 16, 1990 [SE] Sweden ................ 9000150-4

[51] Int. Cl.⁵ ............................................. F16L 33/20
[52] U.S. Cl. ..................................... 285/256; 285/259; 285/334.5; 285/349; 285/379; 29/508
[58] Field of Search .............. 285/238, 256, 259, 254, 285/234, 334.5, 349, 379; 29/507, 508

[56] References Cited

U.S. PATENT DOCUMENTS

| | | | |
|---|---|---|---|
| 787,144 | 4/1905 | Bropson | 285/349 |
| 1,936,552 | 11/1933 | Goss | 285/379 |
| 2,319,024 | 5/1943 | Wehringer | 285/84 |
| 2,432,598 | 12/1947 | Weatherhead, Jr. | 285/84 |
| 2,438,530 | 3/1948 | Woodling | 285/349 |
| 3,207,537 | 9/1965 | Kimbreu | 285/379 |
| 3,501,171 | 3/1970 | Baron | 285/334.5 |
| 3,549,180 | 12/1970 | MacWiliam | 285/256 |
| 3,865,413 | 2/1975 | Mizusawa et al. | 285/334.5 |
| 4,660,867 | 4/1987 | Kemper et al. | 285/256 |
| 4,693,502 | 9/1987 | Oetiker | 285/334.5 |
| 5,127,157 | 7/1992 | Oetiker | 29/508 |

FOREIGN PATENT DOCUMENTS

| | | |
|---|---|---|
| 1167276 | 11/1958 | France. |
| 579395 | 8/1946 | United Kingdom. |
| 704494 | 2/1954 | United Kingdom. |
| 1251811 | 11/1971 | United Kingdom. |

*Primary Examiner*—Eric K. Nicholson
*Attorney, Agent, or Firm*—Burns, Doane, Swecker & Mathis

[57] ABSTRACT

Hose coupling component, especially for a hose connection between a turbo charger and an air cooler in an internal combustion engine, comprises a pipe sleeve (12) of pressed sheet metal, which has a peripheral flange (16) to be fixed by means of a V-shaped clamp to a corresponding mirror image flange on a complementary coupling component. The sleeve has a groove (18) for a gasket in the flange and has a circumferential depression (15) for indexing a hose (1) forced onto the coupling component.

6 Claims, 2 Drawing Sheets

PROCESS FOR MANUFACTURING A HOSE COUPLING COMPONENT INTENDED PARTICULARLY FOR A HOSE CONNECTION BETWEEN A TURBO UNIT AND AN AIR COOLER, AND A HOSE COUPLING COMPONENT OF THIS TYPE

BACKGROUND OF THE INVENTION

The present invention relates to a process for manufacturing a hose coupling component, which comprises a pipe sleeve, which is provided at a first end with a periferal flange projecting from the lateral surface of the sleeve, said flange having a side facing towards a second end of the pipe sleeve and inclined towards said first end, said flange forming an outer limitation of a circumferential groove which is open towards said first end for a gasket ring, said pipe sleeve having as well between its ends a portion with a circumferential profile. The invention also relates to a hose coupling component of this type.

Such a coupling component is used, for example, in hose connections between a turbo charger unit and an air cooler in turbo charged internal combustion engines. The hose connections are intended to absorb the relative movement between the spring suspended engine and the charge-air cooler rigidly mounted on the vehicle frame and it must therefore be able to withstand high temperatures, excessive pressure and mechanical stresses.

A known hose coupling of the type in question consists of an inner pipe sleeve, over which a flexible hose is forced, and an outer ring which is pressed over the hose coaxially with the inner sleeve. The inner sleeve is made of aluminum and the details described in the introduction, such as the flange, the periferal gasket groove and the profiles are made by turning a sleeve blank. In addition to these details, a radial flange is made during the lathe turning of the sleeve blank axially inside the first mentioned flange. The radial flange is intended, inter alia, to serve as an end abutment for the hose and thereby assure that the hose will always be forced the same distance onto the sleeve for assembly, which is important to prevent variations in the total length of the hose and the hose connection between vehicles produced on the assembly line.

This known coupling component, due to its two flanges and the periferal gasket groove at one end, thus has a relatively complicated shape which cannot be produced effectively in any other manner than by machining.

SUMMARY

The purpose of the present invention is to achieve, through a simple modification of the design of the known coupling component, a simpler and less expensive method for its manufacture.

This is achieved according to the invention by virtue of the fact that a bowl is pressed from a sheet metal element, that the upper edge portion of the bowl is folded, so that said flange and the circumferential groove are formed, that the bottom of the bowl is cut away, and that a portion between the flange and an opposite end of the sheet metal element is press rolled so that a profile in the form of a depression is formed in the lateral surface of the pipe sleeve.

This simplification of the end portion of the pipe sleeve due to elimination of the flange serving as a hose abutment, makes it possible to manufacture the pipe sleeve of the coupling component by a pressing process instead of by machining. The depression formed between the two steps serves as a reference for axially positioning the hose on the sleeve. The hose can thus be made with an inner periferal bead at a specific distance from the end of the hose, and when the hose is forced onto the sleeve, the bead will slip into the depression and indicate the correct relative positioning of the components.

BRIEF DESCRIPTION OF PREFERRED EMBODIMENTS

The invention will be described in more detail below with reference to examples shown in the accompanying drawings, where FIG. 1 shows a partially sectioned side view of a previously known coupling component with hose, FIG. 2 is a view corresponding to FIG. 1 of a coupling component according to the invention, and FIGS. 3a and 3b are cross-sections through the inner pipe sleeve in FIG. 2 in different stages of manufacture.

DETAILED DESCRIPTION OF PREFERRED EMBODIMENTS

Figure 1:
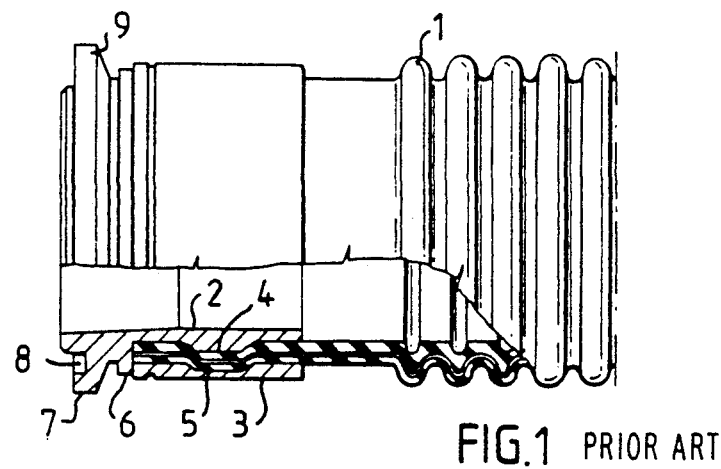

FIG. 1 shows a known design, where 1 designates a corrugated hose of elastic material, which is forced onto an inner coupling sleeve 2 of turned aluminum. An outer ring 3 of steel is pressed over the hose. The sleeve 2 has a profiled portion in the form of a ridge 4, while the ring 3 has a complementary depression 5 for securely fixing the hose on the inner sleeve.

The sleeve 2 has at its left hand end a first flange 6 which forms an end abutment for the hose 1, and a second flange 7 which forms the outer boundary of a groove 8 for a gasket ring. The flange 7 is intended to be brought into contact with a similar but mirror image flange on the component (not shown) to which the hose is to be connected. The flange 7 has an inclined side 9 and thus forms together with said mirror image flange a two-part V-shaped bead, which is held together with the aid of a V-shaped clamp (not shown).

Figure 2:
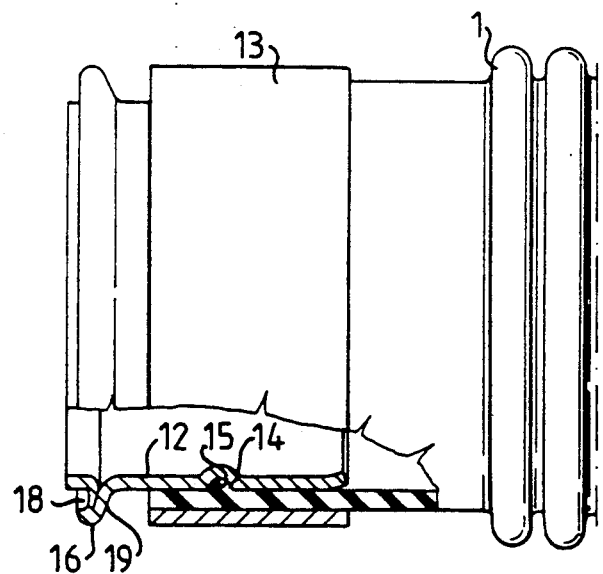

FIG. 2 shows a hose coupling component according to the invention. The hose 1 is in this case forced onto an inner coupling sleeve 12 of pressed sheet metal. An outer ring 13 of steel is pressed over the hose 1, which has an inner periferal bead 14, which lies in a periferal depression 15 in the sleeve. The bead 14 and the depression 15 thus are means which determine how far over the sleeve 12 the hose 1 is to be forced. They also contribute to creating a tight and secure connection between the hose and the sleeve.

The left hand end of the sleeve 12 is folded in a press so that a flange 16 is formed, corresponding to the flange 7 of the known sleeve. This flange 16 also has a groove 18 for a gasket ring and has an inclined side 19. The flange 16 can be brought into abutment with a similar mirror image flange of pressed sheet metal or turned aluminum on the component to which the hose is to be connected and can be fixed thereto in a known manner with the help of a V-shaped clamp.

Figure 3A:
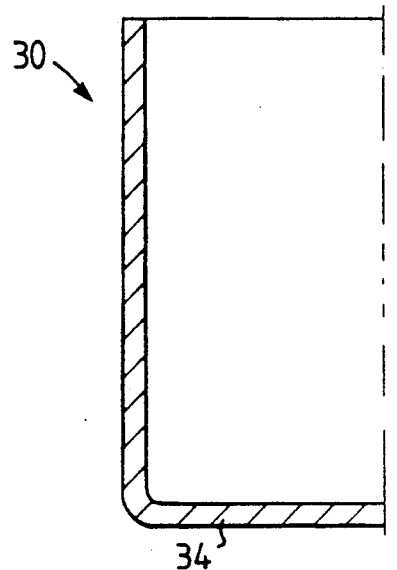
Figure 3B:
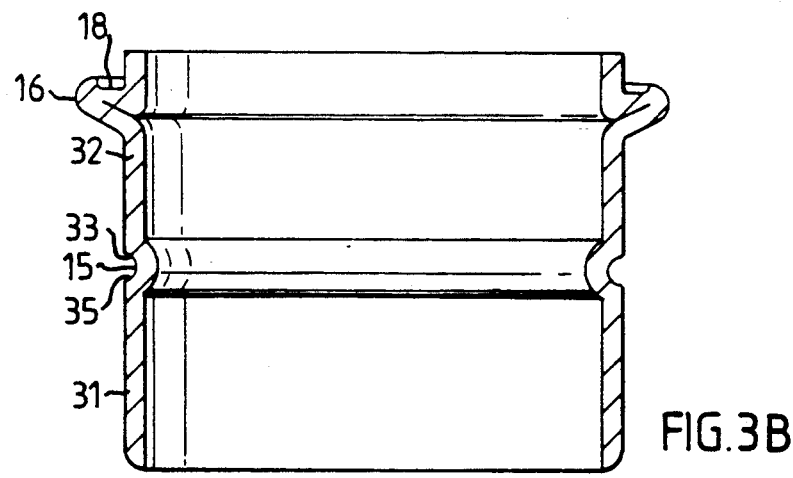

When manufacturing the sleeve 12 according to the invention, one starts with a sheet metal blank, which is deep drawn so as to form a bowl or cup 30 with the shape formed in FIG. 3a. After deep drawing, the bottom 34 of the bowl (see FIG. 3a) is cut off, and the depression 15 for the bead 14 is created by press rolling.

The invention thus provides a coupling sleeve which can be manufactured at substantially lower cost than the known coupling sleeve described without any negative defect on function or reliability.

I claim:

1. Method of manufacturing a hose coupling component, comprising a pipe sleeve, which is provided at a first end with a peripheral flange projecting from a lateral surface of the sleeve, said flange having a side facing towards a second end of the pipe sleeve and inclined towards said first end, said flange forming an outer limitation of a circumferential groove which is open towards said first end for a gasket ring, said pipe sleeve also having between its ends a portion with a circumferential profile, wherein a bowl is pressed from a sheet metal element, the upper edge portion of the bowl is folded, so that said flange and the circumferential groove are formed, the bottom of the bowl is cut away, and a portion between the flange and an opposite end of the sheet metal element is press rolled so that a profile in the form of a depression is formed in the lateral surface of the pipe sleeve.

2. Hose coupling component, comprising a pipe sleeve, which is provided at a first end with a circumferential flange extending from a lateral surface of the sleeve, and having a side facing a second end and inclined towards the first end, said flange forming the outer limitation of a circumferential groove open towards the first end, for a gasket ring, said pipe sleeve having between its ends a portion with a peripheral profile, the pipe sleeve comprises a pressed sheet metal element, which has at a first end a folded edge portion, forming said flange and said circumferential groove, said pipe sleeve having a profile portion in the form of a depression in a lateral surface of the pipe sleeve between the flange and its opposite end.

3. A hose coupling component, comprising:

a pipe sleeve having a first end and a second end;

a circumferential flange arranged on said pipe sleeve at the first end thereof;

said flange having a side facing toward said second end, wherein said side is inclined toward said first end;

a first circumferential groove arranged in said flange, said groove being open towards said first end of the pipe sleeve;

a second circumferential groove arranged around said pipe sleeve at a location between said flange and said second end.

4. The hose coupling of claim 3, wherein said flange comprises a folded portion of the pipe sleeve.

5. The hose coupling of claim 3, wherein said second circumferential groove comprises a depression in the surface of the pipe sleeve that protrudes into the interior of the pipe sleeve.

6. The hose coupling of claim 4, wherein said second circumferential groove comprises a depression in the surface of the pipe sleeve that protrudes into the interior of the pipe sleeve.

* * * * *